Oct. 25, 1960 — G. WHITE ET AL — 2,957,277
APPARATUS FOR BENDING GLASS SHEETS
Filed Oct. 12, 1953 — 7 Sheets-Sheet 3

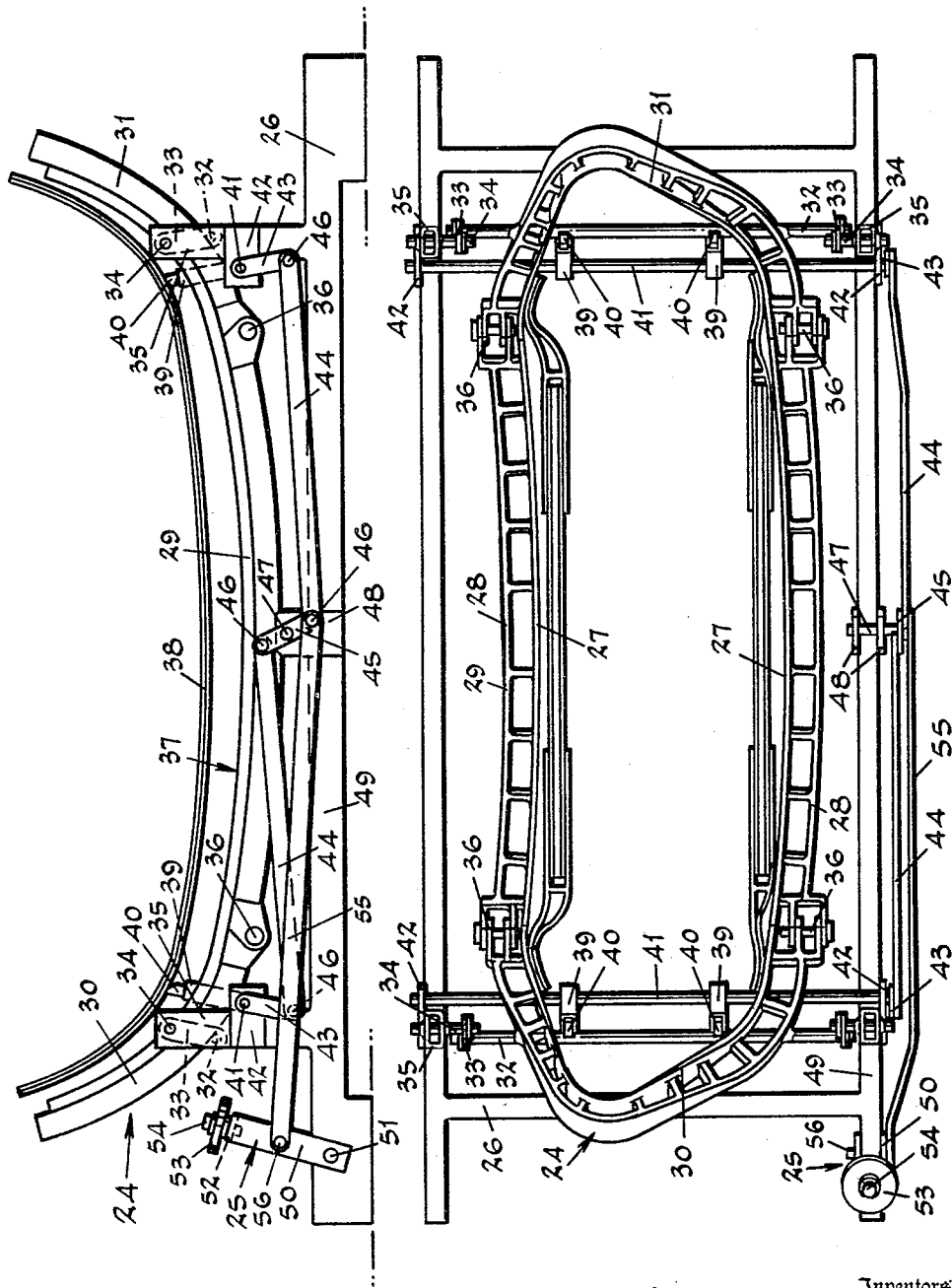

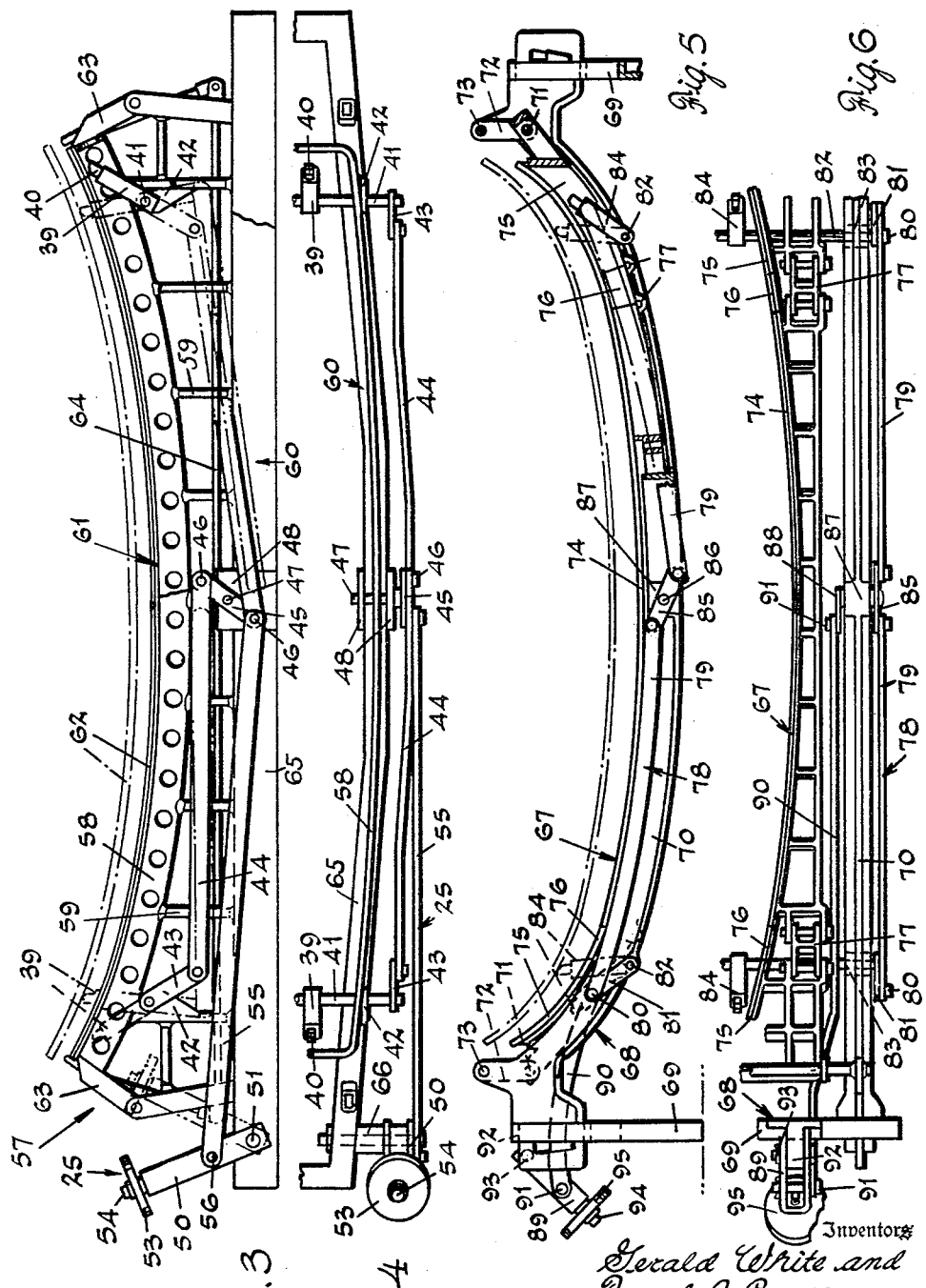

Inventors
Gerald White and
Frank J. Carson
By Nobbe & Swope
Attorneys

Oct. 25, 1960    G. WHITE ET AL    2,957,277
APPARATUS FOR BENDING GLASS SHEETS
Filed Oct. 12, 1953    7 Sheets-Sheet 5

Inventors
Gerald White and
Frank J. Carson
Nobbe & Swope
Attorneys

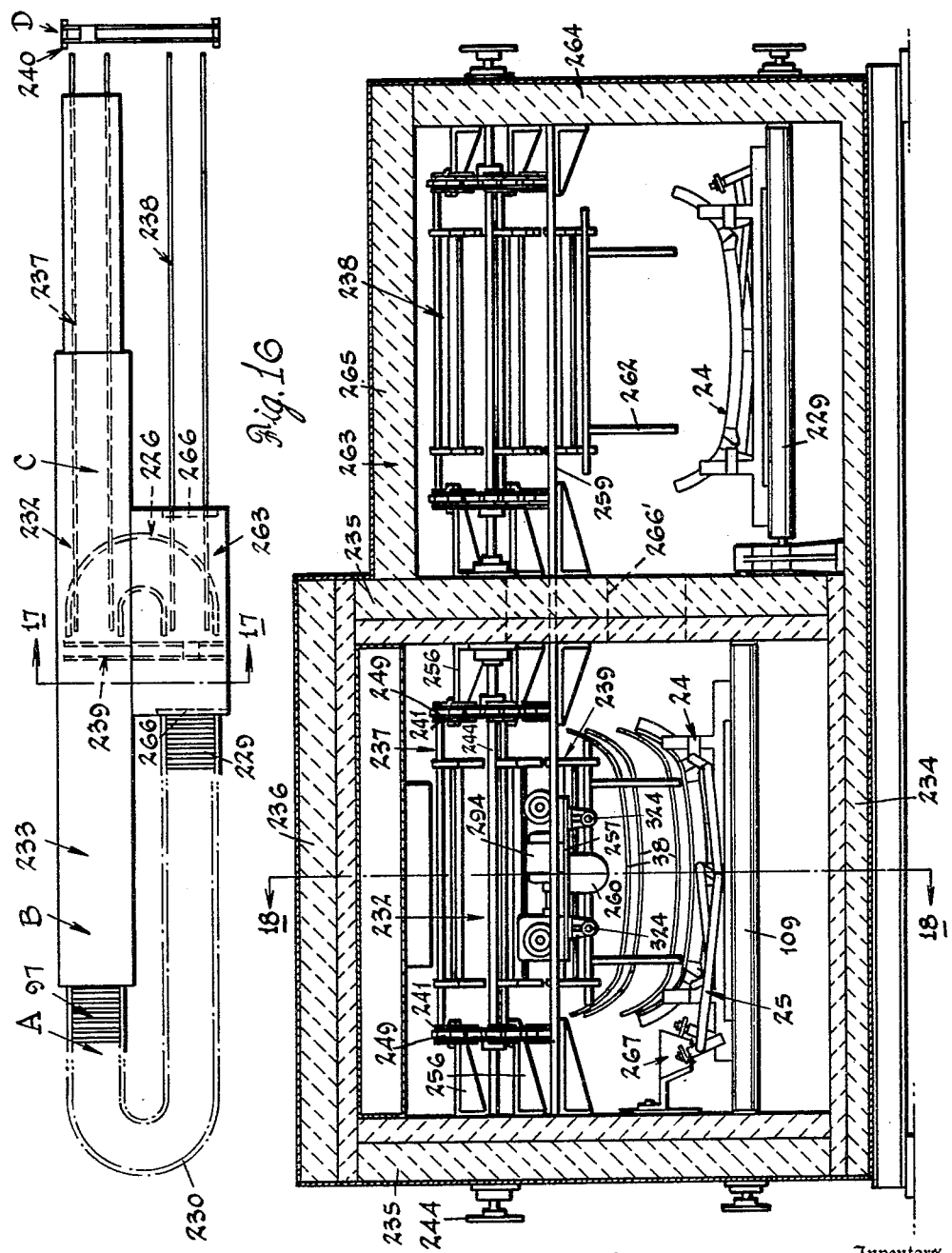

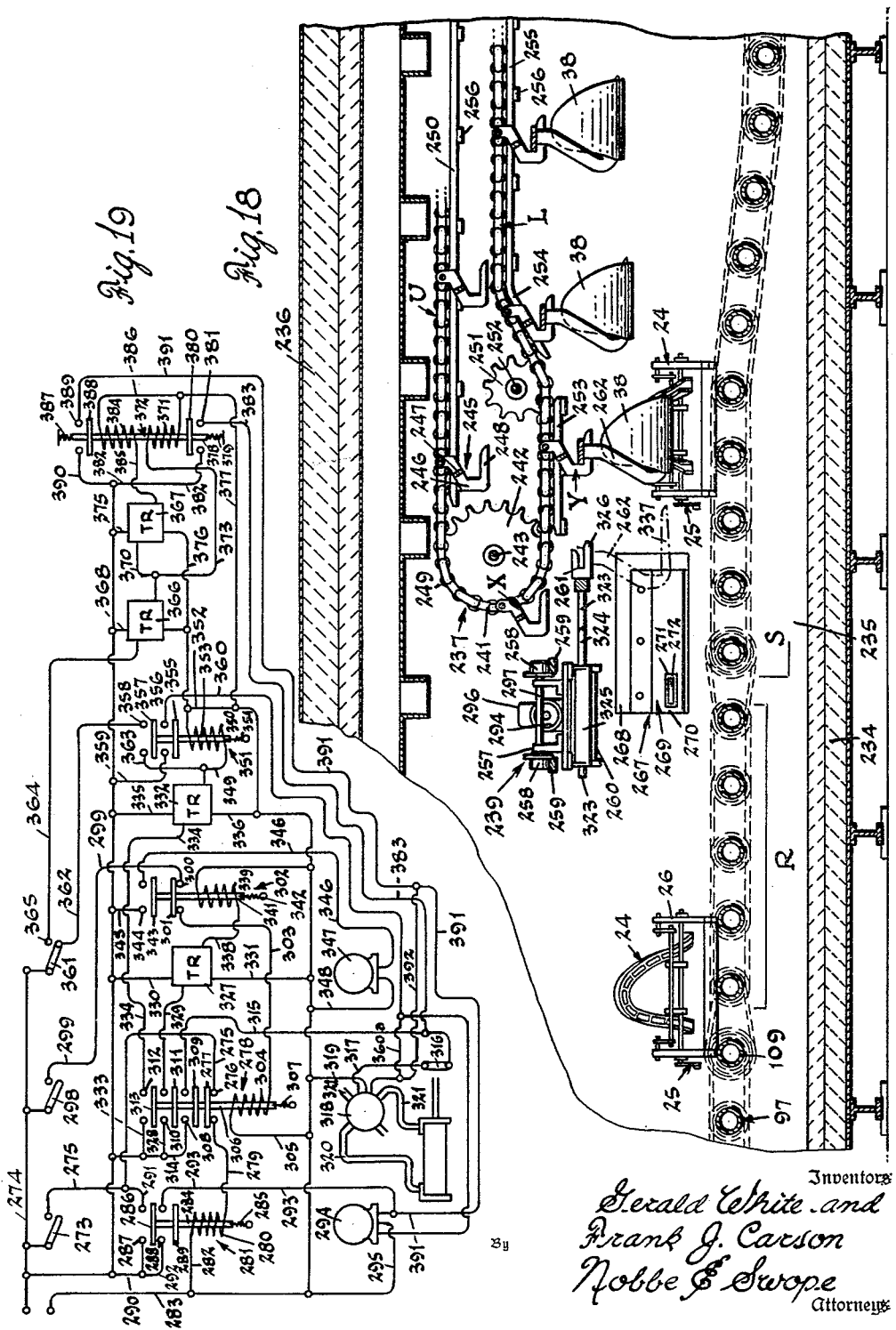

United States Patent Office 2,957,277
Patented Oct. 25, 1960

2,957,277
APPARATUS FOR BENDING GLASS SHEETS

Gerald White, Rossford, and Frank J. Carson, Toledo, Ohio, assignors to Libbey-Owens-Ford Glass Company, Toledo, Ohio, a corporation of Ohio Filed Oct. 12, 1953, Ser. No. 385,534

1 Claim. (Cl. 49—7)

This invention relates broadly to the bending of sheet materials such as glass or the like. More particularly, the invention has to do with a novel procedure for achieving a more uniform cooling, and consequently a better annealing, of bent glass sheets by the timely removal of the same from the surfaces upon which they have been bent or shaped to the desired curvature.

Generally stated, the present-day commercial bending of glass sheets is usually carried out on metal molds, by procedures which involve first positioning the glass sheets on the mold and then heating the glass and the mold to the bending temperature of the glass, whereupon the heated sheet is bent by the action of gravity and/or applied mechanical force into conformity with the shaping surface of the mold. In the common bending methods, the mold not only supports the glass during bending, but also acts to convey it through the subsequent cooling or annealing treatments to which it is subjected.

In other words, in conventional, continuous bending procedures, the glass sheets remain on the mold from a loading area, in which the sheet is placed in bending position on the mold; through the bending zone of a furnace, wherein the glass (soda-lime-silica sheet or plate) is subjected to temperatures ranging upwardly to twelve or thirteen hundred degrees Fahrenheit while it is being softened and shaped to the mold surface; and then through furnace zones of progressively decreasing temperatures, until the mold arrives at a point where the glass has cooled sufficiently to be handled and where it is finally removed from the mold.

Production-wise this practice lends itself advantageously to the use of a multiplicity of substantially duplicate molds whereby a great many bent glass sheets of the same curvature can be rapidly and continuously obtained.

However, during such a bending cycle, we have found that, from shortly after the peak bending temperature has been passed, and until the mold and glass have cooled to normal or approaching room temperature, an objectionable temperature differential exists between the metal of the mold and the areas of the glass sheet that are in contact therewith. This is due not only to the natural or physical differences of the glass and the metal but may also stem from peculiarities of the required mold construction and the inherent way in which heat is transmitted throughout its component, integral parts.

To illustrate, the particular size of sheet or the curvature to which it is to be bent will determine the mold construction so that there will be "built-in" areas or sections which will absorb heat more or less rapidly than other areas and conversely will dissipate such heat in the same manner. It appears that after the initial drop from the bending temperature, i.e., from around 1140° F. to 1000° F., and through the initial annealing stage from 1000° F. to 900° F., that the metal of the mold inherently cools either more slowly or more rapidly than the glass which, in the vicinity of these temperatures, is gradually returning to its normally rigid structural condition. This phenomenon is also known to continue during the further reduction of temperature, as from 900° F. downward during the course of which the glass is intended to be cooled quite rapidly.

Such temperature differentials produce non-uniform cooling of the bent glass sheets over an extremely critical temperature range and result in poor and improper annealing. In fact, where the differential in temperature develops with sufficient rapidity, defects known as "chill cracks" are created which mar the optical quality of the glass, causing rejects or even complete breakage.

According to this invention, however, such difficulties are eliminated by immediately removing the bent glass sheets from the bending surfaces of the molds as soon as the glass has reached a temperature at which the sheets are "set," i.e., at which they so closely approach their normally rigid structural condition that they will accurately retain their bent curvature without distortion; and, in an amplified form of the invention, the bent sheets may subsequently be removed bodily from the mold to suitable supports upon which they can be carried through the cooling zones of the furnace until they have become completely and uniformly annealed.

The separation of glass and metal mold during the critical temperature span, as contemplated by this invention, makes it possible to set up more easily controlled annealing periods which may result in more rapid, as well as in the more uniform, annealing of the glass sheets. At the same time, the procedure permits more rapid return of the bending molds to the loading end of the furnace, and the consequent reduction in the number of molds required.

It is therefore an aim of the present invention to provide an improved apparatus for annealing and cooling bent glass, and to provide an apparatus for separating bent glass sheets from their associated bending molds so that they may be better and more uniformly annealed during passage through the cooling zones of the bending furnace.

Another object of the invention resides in apparatus for spacing bent glass sheets above the shaping surface of a bending mold and then removing the sheets bodily from the mold onto a novel conveying means while both the glass and the mold are subject to an adequately heated temperature but which is lower than the highest critical bending temperature.

A further object of the invention is to provide a handling apparatus for bent glass sheets which may be operated to lift said sheets to a position above the shaping surface of a bending mold to permit uniform annealing of the glass sheet while out of contact with the mold.

Another object resides in the provision of handling apparatus for bent glass sheets which will automatically lift the said sheets to a position above the shaping surface of a bending mold and then operate to remove the sheets bodily to a suitable conveyor means disposed within the annealing area of a bending furnace.

A further object of the invention is to provide a lifting device carried on a bending mold and normally out of contact with glass sheets supported thereon which is operable to position the said sheets above the shaping surface of the mold, together with means automatically activated by said lifting device to remove the bent glass sheets bodily from the bending mold and onto a conveyor means.

A still further object of the invention resides in the provision of an automatically operating conveyor means within the annealing area of a bending furnace which means is actuated in timed relation to the sequential entry of bending molds into the said annealing area.

Other objects and advantages of the invention will become more apparent during the course of the following description when read in connection with the accompanying drawings.

In the drawings, wherein like numerals are employed to designate like parts throughout the same:

Fig. 1 is a side elevation of a hinged bending mold equipped with a glass sheet lifting device constructed in accordance with the present invention;

Fig. 2 is a plan view of the bending mold shown in Fig. 1;

Fig. 3 is a side elevation, partly in cross-section, of another form of bending mold equipped with a glass sheet lifting device;

Fig. 4 is a fragmentary plan view of one side of the mold of Fig. 3, illustrating the arrangement of the lifting device;

Fig. 5 is a side elevation, partly in cross-section, of a third form of bending mold equipped with a lifting device according to this invention;

Fig. 6 is a fragmentary plan view of the bending mold of Fig. 5;

Fig. 9 is a longitudinal vertical section of the bending furnace as taken substantially on line 9—9 of Fig. 7;

Fig. 16 is a plan view of a bending furnace equipped with a modified form of handling apparatus;

Fig. 17 is a transverse vertical section of the furnace of Fig. 16, taken substantially on line 17—17 of Fig. 16;

Fig. 18 is a longitudinal vertical section of the furnace as taken substantially on line 18—18 of Fig. 17, and Fig. 19 is a diagrammatic view of an electrical control system for the handling apparatus of the bending furnace disclosed in Fig. 16.

Figure 7:
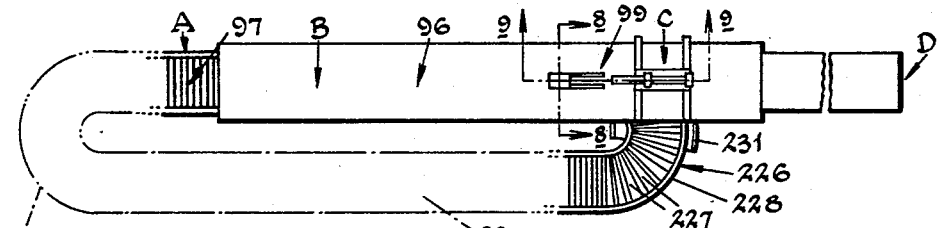
Fig. 7 is a plan view of a conventional furnace for bending and annealing glass sheets.

The bending of glass sheets is of course a relative term which broadly encompasses several general procedures and variations of bending molds on which such bending can be practiced. For example, the glass sheets intended for use as curved automobile windshields of so-called "safety" glass are usually handled in pairs, are simultaneously bent on one mold and then annealed or cooled during their movement through zones of controlled and progressively lowered temperatures. Such a manner of bending can also be carried out on various forms of molds which, as herein to be disclosed, are termed "solid ring" for shallow bends and "hinged" for more complex bends that may include sharply upwardly rising end areas. Heretofore, however, the bending of glass sheets on either of these forms of molds has followed a generally similar pattern, in that, after bending of the glass, the molds continued to carry the glass through the annealing area of the bending furnace.

Glass sheets intended for use as the rear windows of automobiles, or for other allied safety purposes, may be tempered and for this purpose the molds on which the bending is produced are constructed so that the racks or bases thereof simulate the curvature of the mold per se in order that the structure can be passed between apparatus for supplying blasts of cool air to rapidly chill the bent glass. Thus when such glass sheets have been bent it is customary for them to be carried by the molds between suitable blastheads for sudden chilling and then permitted to slowly cool to an additional extent as they are conveyed toward a point for unloading.

There is, therefore, a similarity in the procedure of bending both annealed and tempered glass in that considerable time is expended, after the bending has been accomplished, and during which the molds are serving merely as carriers for the glass sheets. Also, since the metal of the mold cools at a different rate, which may be either faster or slower than the glass sheets, there is inevitably a differential of temperature that may cause optical defects or even glass breakages. Our invention is intended to overcome both of these problems by lifting and supporting the glass sheets above and out of contact with the shaping surface of the mold as soon as possible after they have been bent thereon. This removal or separation of the sheets from contact with the mold structure occurs when the condition of the glass is sufficiently rigid as to retain the imparted curvature. Preferably the lifting of the glass sheets is performed at a time when the surrounding furnace temperature is still being maintained and while the heat of the glass itself is too high for manual handling. Accordingly the invention provides means for automatically effecting the lifting of the bent glass sheets from the molds and for subsequently bodily removing the bent sheets to suitable conveyors.

Referring now more particularly to the drawings, the bending molds illustrated there are to be considered as typical of conventional molds for realizing the production of either annealed or tempered bent glass. Thus, in Fig. 1, there is disclosed a bending mold 24, commonly described as a "hinge" type mold, and that is equipped with a lifting device 25 in accordance with the present invention.

The mold 24 is generally supported on a base or rack 26 and is formed of fabricated rail sections 27 and 28. The rail sections are shaped both in plan and in the vertical plane to provide the desired outline and curvature for the central section 29 and end sections 30 and 31 of the mold 24. The mold is bodily supported on the rack 26 by means of laterally disposed rods 32 that are fixedly secured to the end mold sections and carried at their opposite ends by links 33 suspended from rods 34 extended inwardly from rack upright members 35.

The central section 29 and end sections 30—31 of the molds are hingedly interconnected as as 36 whereby said end sections may be swung from the closed position (in which they are illustrated in Fig. 1) to an open position in which the extreme ends of the said sections are spaced apart a distance substantially equal to the length of the glass sheets they will receive. While the rails 27 and 28 of mold sections 29, 30 and 31 are shaped in plan for pattern-cut glass sheets and curved in a vertical plane for one particular curve, it is neither intended to preclude the shaping of such sections for use with uncut or block sizes of sheet nor with any other desired curvature. Also the sheets may be located or supported relative to the shaping surface of the mold in any conventional manner. The shaping surface here is afforded by the accurately finished top or upper surface of the rail 27 of each mold section as indicated at 37.

Figure 10:
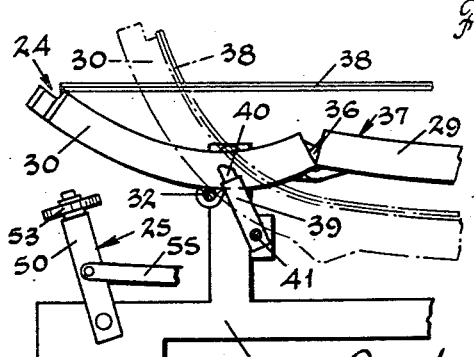
Fig. 10 is a diagrammatic view showing the position of the lifting device in relation to a bending mold while parts thereof are in the open and closed positions.

Referring briefly to Fig. 10, it will now be seen that when the end section 30 is in its open position, as indicated in full line, relative to the central section 29, it will support one end of flat glass sheets 38; and, when the sections are in their related closed positions after the glass has reached bending temperature, as shown in broken lines, the sections 29 and 30 will have produced the desired bent curvature in glass sheets 38. Now, according to the practice of our invention, when the bent sheets have cooled sufficiently as, for purposes of illustration, from approximately 1200° F. to around from 700 to 980° F., they will have passed from the semi-plastic to a more rigid although still highly heated condition, the mold will have achieved its essential purpose, and the sheets will then be raised therefrom.

For this purpose (as shown in Figs. 1 to 4 and 10) the lifting device 25 is operable to engage and elevate the bent glass sheets 38 above the shaping surface 37 by means of contacting fingers 39 that are arranged within the perimeter of the mold to engage the sheets at uniformly distributed points. Preferably the fingers 39 are of a tubular cross-section in order that their engaging outer ends may be formed by such a material as marinite, graphite or the like. This material in the form of a block 40 may be inserted into the end of the tubular fingers. The fingers are arranged in pairs at each end of the mold and are supported on rods 41 that are located transversely of the mold and disposed beneath the under surfaces of the end mold sections 30 and 31. More particularly, the fingers 39 are attached to the rods as by welding and the rods are pivotally supported in plates 42 secured to adjacent upright members 35 of rack 26.

At one side of the mold, the rods 41 are equipped with arms 43 and these are interconnected for joint movement by links 44 and a swing-arm 45. As herein shown, the arms 43, the links 44 and swing-arm 45 are pivotally joined by studs 46 while the swing-arm is rotatably mounted by a pin 47 on plates 48 affixed to the side rail 49 of rack 26.

The links 44 are adapted to actuate and swing the fingers 39 by rods 41 and arms 43 by means of a lever 50 that is pivotally mounted by a pin 51 on the side rail 49. As shown in Figs. 1 and 2, this lever may be simply, though not necessarily, formed in the shape of a U and arranged in an inverted position so that the legs thereof span the side rail. The web or mid-section 52 is thus adapted to rotatably support a roller 53 by pin 54. The lever 50 and swing-arm 45 are interjoined by a link 55, a suitable stud 56 mounting the link on the lever while at its opposite end the lower stud 46, supporting one end of link 44 on the swing-arm 45, will serve the purpose.

The lever 50 of the lifting device 25 is normally intended to be disposed, according to the present construction, in an inactive, outwardly directed angular position (Fig. 10) and to produce operation of the lifting device as it is swung or actively moved to an inwardly angular position as shown in Fig. 1. The extent of this swinging movement will carry the contacting fingers 39 from a position as shown in Fig. 10 in which they are disposed beneath the bent glass sheets 38 to a position as in Fig. 1 in which they will have raised the sheets above the shaping surface 37 and also will have passed through a "deadcenter" position in order that they will not be inadvertently returned by the weight of the glass to their original positions. Obviously for some bending procedures, the lever 50 can be manually operated by means of a bar inserted through one of the furnace ports; however, as hereinafter to be described, the lever by means of the roller 53 is adapted to be automatically actuated after bending of the glass sheets has occurred and the mold has passed a sufficient distance beyond the actual bending zone of the furnace to permit the glass to "set." Also when the lever has been so operated, it may serve as the initiator of a conveyor system whereby the glass sheets from their elevated position above the shaping surface of the molds will be bodily removed therefrom.

While the lifting device 25 has thus far been described only in connection with a bending mold 24 of the hinged type, the same is equally well adapted to be employed on a mold of a solid ring construction. Thus, as shown in Figs. 3 and 4, there is disclosed a bending mold for producing more shallow curvatures than the mold 24. This mold, generally indicated by the numeral 57, is of the same general character as that described in Patent No. 2,554,572, issued May 29, 1951 to Joseph E. Jendrisak, and comprises a solid ring portion 58 that is supported by posts 59 affixed at their lower ends to a base or rack 60. The shaping surface of this particular form of bending mold may be provided, as at 61, on the upper surface of the continuous or solid ring 58 which is finished to the desired curvature to be imparted to the glass sheets.

Glass sheets 62 to be bent are arranged on and supported by pivoted support members 63 that are adapted to receive the sheets when flat and carry the ends thereof until bending is completed. The support members 63 are interconnected for synchronized movement by a linkage generally indicated by the numeral 64.

This form of mold, as in the case of the mold 24, has heretofore been generally employed to first bend glass sheets and then to support them during the annealing cycle which follows immediately. In its operation, the members 63 are arranged in outwardly disposed positions and the glass sheets 62 located thereupon. As the sheets soften, when properly heated, and sag onto the shaping surface 61, the support members 63 move inwardly carrying the ends of the sheets at an equal rate of motion by means of the linkage 64.

However, as herein shown, a lifting device 25 may also be advantageously employed with a mold of this solid ring character since it too merely supports the glass sheets once the bending thereof has been accomplished. For this purpose, the rods 41 of device 25 can be supported by plates 42 which are shown as affixed to adjacent posts 59 of the mold rack 60. The fingers 39 on rods 41 are arranged in substantially aligned positions in the corner areas of the mold ring 58 and are adapted to raise the glass sheets 62 from a position as shown in full line to the elevated position as shown in broken line (Fig. 3). The swing-arm 45 is supported by the pin 47 carried by plates 48 attached to a rail 65 of the base 60 while the lever 50 may be pivotally mounted with respect thereto by means of a bracket portion 66.

Consequently, as in the case of the bending mold 24, when the mold 57 has carried the bent glass sheets from the bending zone of a furnace into the adjoining annealing zone, and the glass has become "set," the lever 50 may be actuated to elevate the glass sheets from the shaping surface 61. And further, as the molds are moved within the confines of the annealing zone, the sheets can subsequently be bodily lifted from their supported positions above the mold.

This same apparatus for handling annealed bent glass sheets can also be employed in the handling of tempered bent glass sheets. Essentially, in the latter type of procedure too, after the bending and tempering has been carried out, conventionally operated bending molds only further serve to convey the glass sheets, as they cool, additionally to an unloading point. Moreover, as is also the case with annealed bent glass, the more rapidly that the bending molds can be returned to the loading area, the fewer molds need be employed.

A bending mold on which a glass sheet is also to be tempered however, differs essentially from those previously described in that it is usually constructed so as to pass the glass sheet through or between the blast heads of the tempering equipment. For purposes of illustration, therefore, the bending mold shown in Figs. 5 and 6, is more especially constructed for the bending and tempering of glass sheets. As herein set forth, and as more fully described in a patent to Joseph E. Jendrisak, No. 2,551,607, granted May 8, 1951, this particular mold, generally indicated by the numeral 67, is supported on a rack 68 that comprises end frame sections 69 and aligned side rails 70. The mold 67 is generally supported on the rack 68 by means of rods 71 carried by links 72 which at their opposite, upper ends are pivotally supported by rods 73 secured generally to the side rails 70. More particularly, the mold 67 is formed by a central section 74, end sections 75 and intermediate sections 76 disposed therebetween. These several mold sections are conventionally interconnected by hinge members indicated at 77. Although not specifically herein disclosed, when the sections of the mold 67 are moved to their open position for receiving a flat sheet of glass, they swing relative to one another by means of the hinges 77 and the overall expanse of these sections is compensated for by the related swinging movements of the links 72.

In order to employ a lifting device, as constructed in accordance with this invention, with a bending mold of the streamlined shape illustrated in Figs. 5 and 6, it is obviously necessary that the required links and levers be disposed while inactively located, or so formed, that there will be no interference with the tempering apparatus during passage of the mold therethrough. To this end, the lifting device, generally indicated at 78, is formed so that the links 79 thereof will lie within the confines of the height of the side rails 70. Preferably these links are shaped to a slight curvature to agree with the curvature of the central mold section 74. The links 79 are connected by studs 80 to the arms 81 secured to the end of rods 82. The rods 82 are journaled in bosses 83 formed in the side rails 70 and within the outline form of the mold 67 carry the contact fingers 84.

At their inner ends, the links 79 are pivotally connected to a swing-arm 85 that is supported and fixedly secured to one end of an axle 86. The axle is journaled in a boss 87 centrally disposed in one of the side rails 70. At the opposite end of the axle 86, a crank 88 is fixedly secured. The crank 86 is connected to the lever 89 by means of a link 90 and studs 91, said link also being suitably curved to conform to the mold construction. The lever 89 is carried by boss 92, integrally formed on a portion of one end frame section 69 of the rack 68, by a pin 93. And rotatably supported on the lever by a stud 94 is the roller 95.

During movement of the mold 67 through a bending furnace and the adjoining tempering apparatus, the component parts of the lifting device 78 are positioned as shown in full line in Fig. 5 so that the contacting fingers 84 are entirely out-of-contact with the glass sheet surface even after the sheet has been bent into conformity with the mold. However, when the lever 89, or the roller 95, is engaged to swing the lever inwardly, the resultant action through the link 90, swing-arm 85 and links 79 will cause rods 82 to move the contacting fingers upwardly and in so doing cause them to engage and lift the glass sheet to a position, indicated in broken line, above the mold shaping surface. Thereafter the glass sheet, if desired, may be removed for subsequent cooling to substantially room temperature while the mold is returned to the loading area of the furnace.

Figure 11:
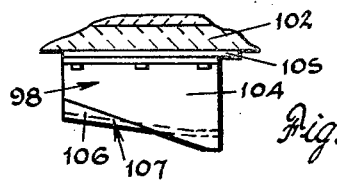
Fig. 11 is a detail view of a cam member for actuating the lifting device on a bending mold.

In carrying out the disclosed method of handling bent glass sheets in its entirety, certain modifications are required to be made in and to the cooling ends of conventional bending furnaces in order that the glass sheets can continue their travel into and through the annealing zone thereof while the molds are carried immediately outward from the furnace and onto a return conveyor. Thus, in Fig. 7, the furnace 96 is shown diagrammatically to have an entry end A at which point the empty molds are supported on an exposed section of a continuous conveyor line 97; a heating section B wherein the glass sheets are gradually softened and bent into conformity with the mold's shaping surface; an annealing section C and an unloading end D. Now, according to this invention, at a suitable area within the annealing section C when the temperature of the glass sheets has reduced to the vicinity of 700°–980° F., a handling apparatus is disposed to lift the sheets from the mold shaping surface and, in one contemplated procedure, remove them onto a suitable conveyor. This handling apparatus includes an actuator or cam element 98 (Fig. 11); a removing mechanism 99 and a continuously operating conveyor 100 (Fig. 9) that is independent of the conveyor 97 for the bending molds. Also as herein shown the furnace may be constructed of suitably insulated walls of refractory materials to form the bottom wall or floor 101, side walls 102 and top or ceiling 103.

Figure 8:
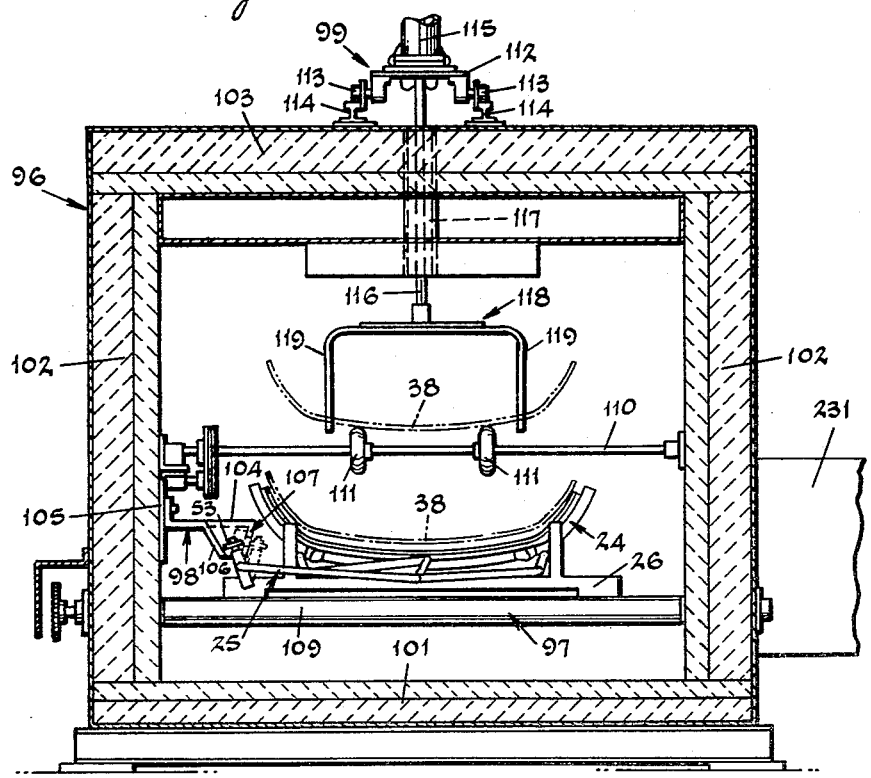
Fig. 8 is a transverse, vertical section of the bending furnace as taken substantially on line 8—8 of Fig. 7.

The cam element 98 broadly comprises a flanged plate 104 suitably secured to a mounting plate 105 attached to an inner wall surface of the furnace 96. The depending flange 106 of the plate 104 is shaped as will be seen in Figs. 8 and 11, to be inclined angularly on one side of a vertical plane and to continue in its length to change the oriented angle to an angular inclination oppositely disposed to the vertical. The cam surface 107 thus developed is intended to engage the roller of a lifting device and cause the associated lever to be swung through its operative stroke. For purposes of illustration, the mold 24 has been shown and in Fig. 8, the related roller 53 is indicated in full line as at the point of engagement with the cam element 98 and in broken line as at the end of such engagement. This will produce an elevation of the glass sheets 38 from the full line position up to the broken line position with respect to the mold. As the roller 53 traverses the rear end area of the cam element 98, it is carried over and so as to depress the arm 108 of a suitable switch.

Preferably the mold conveyor 97 includes a series of horizontally disposed parallel rollers 109; the axles of which are extended outwardly of the furnace side walls 102 and journaled in suitable bearings. Along one side of the furnace, these axles are conventionally equipped with sprockets whereby the rollers 109 are continuously operated to provide a uniform rate of speed for conveying the molds forwardly. Since the molds are substantially closely spaced it may be found highly practical to increase the rate of movement of a mold as it approaches the vicinity of the cam element 98 and consequently advance it ahead of its normal position relative to the next succeeding mold. Thus as the mold, indicated at E, reaches such an indicated position, its motion will be accelerated until it arrives at a position denoted by the letter F where the motion will be decelerated to the normal speed.

As the mold and associated lifting device reaches the cam element 98 and then operates the switch-arm 108, the removing mechanism 99 is actuated to remove the glass sheets 38 from their respective mold to the conveyor 100. This conveyor may be provided in the form of a pair of roller driven conveyor belts, or, as shown herein, include a plurality of power driven shafts 110 on which are mounted roller elements 111. The mechanism 99 is embodied in a truck 112 having suitably journaled wheels 113 whereby it may traverse rails 114 mounted on the exterior surface of the top wall 103 of the furnace. The truck carries a vertically disposed cylinder 115, the piston rod 116 of which depends downwardly through a slotted aperture 117 in the top wall 103. At the lower extremity of the piston rod 116, an especially constructed frame 118 is secured and this frame has a pair of spaced L-shaped arms 119 for engaging and removing the glass sheets from the mold.

The traversing action of the truck 112 and the vertical travel of piston rod 116 combine to produce a series of motion which are indicated by arrows identified by lowercase letters $a$, $b$, $c$, $d$ and $e$. Thus while the truck is stationarily positioned, as shown in Fig. 9 of the drawings, and when the switch-arm 108 is actuated, the cylinder 115 is operated to lower the frame 118 by piston rod 116 in the direction of arrow $a$. By means of an electrical control system to be more fully hereinafter described, the rod 116 at the limit of its controlled downward motion produces a sequence of events whereby the truck is caused to carry the frame 118 forwardly to move the horizontally disposed portions 120 of arms 119 between the glass sheets 38 and the surface of the mold 24, above which they are supported, and as is indicated by the arrow $b$. At this juncture in the operation, there is a combination of events occurring since the mold is moving slowly forward on the conveyor rollers 109 while the truck 112 is carrying the frame 118 forwardly at a sufficiently faster rate of motion to insert the horizontal portions 120 beneath the glass sheets. Now if the truck were to remain stationary the mold could obviously proceed from beneath the glass sheets; however, when the truck has carried the frame to a position as indicated by the lower representation of the frame in broken line, it causes a reversal of pressure within the cylinder 115 to the end that the piston rod 116 raises the frame in the direction of arrow c. At the controlled upper limit of the piston rod's motion, the truck is caused to carry the frame 118 forwardly, as indicated by the arrows d, at a higher level.

When the frame has been moved to a position denoted by the second representation in broken line, motion of the truck is halted preparatory to its returnward travel as indicated by arrow e. As the truck temporarily stops at the terminus of its travel, the horizontal portions 120 will have delivered the supported glass sheets to and so that the rollers 111 will carry the same from said legs. The trucks 112 is then moved rearwardly in the direction of arrow e until it arrives at the position indicated by the full line representation.

For purposes of illustration, the truck 112 is motivated by means of an air-motor 121 which is more or less schematically shown in Fig. 9. According to one construction of such types of motors, a piston rod, as the rod 122, is equipped with two pistons; one somewhat centrally disposed on the rod, as at 123, and within a cylinder 124 while a second piston 125 is mounted on the rear end of the rod and contained with a cylinder 126. The cylinder 124 is connected to a suitably controlled source of power and operates to produce motion of the rod 122 by direction of applied pressure against the piston 123; on the other hand, the cylinder 126 operates as a closed circuit and the flow from one end is received in the opposite end. By controlling the rate of flow in either direction, the rate of motion of the piston rod can be monitored since the pressure applied in cylinder 124 will only be as effective as the rate of flow between the ends of the cylinder 126. Thus the conduit 127 from the forward end of this cylinder may be connected to a valve 128 and through said valve to the opposite end of the cylinder 126 by branches 129 and 130; obviously when the valve restricts flow into the conduit branch 129, the exhausting flow from the forward end of the cylinder will be diminished to the capacity of branch 130.

Figure 15:
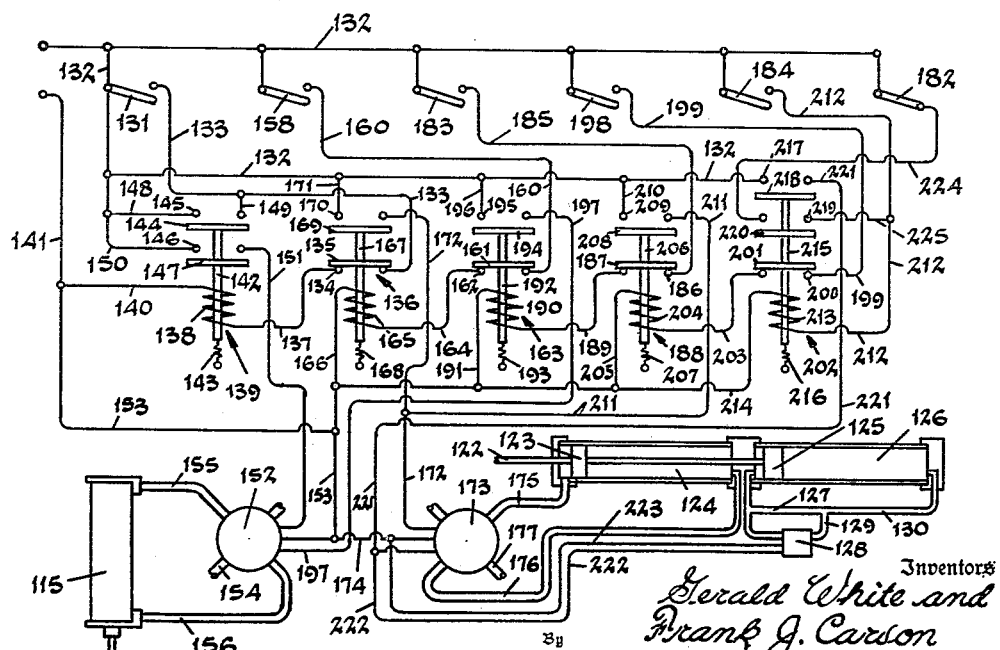
Fig. 15 is a diagrammatic view of an electrical control system for the glass sheet handling apparatus.

In order that an operational sequence of events can be effectively carried out, an electrical system is diagrammatically shown in Fig. 15 as representative and explanatory of a control system for the handling apparatus herein disclosed. Accordingly when the roller 53, on lever 50 and carried by the mold 24, is moved along the cam surface 107, it engages the arm 108 and produces closure of a normally open micro-switch 131. Switch 131 is connected to one source supply line 132, and when closed completes a circuit by line 133, the closed contacts 134—135 of relay switch 136, line 137 through coil 138 of relay switch 139 and by line 140 to the opposite source line 141. This produces energization of said coil and actuation of the armature 142 against spring 143 to close pairs of contacts 144—145 and 146—147. Contacts 144—145 complete a holding circuit for coil 138 by line 148 from source line 132 and branch 149 to line 133, while contacts 146—147 complete a circuit through line 150 from source line 132, by line 151 to a four-way electrically operated valve 152 and thence by line 153 to the source line 141.

Figure 12:
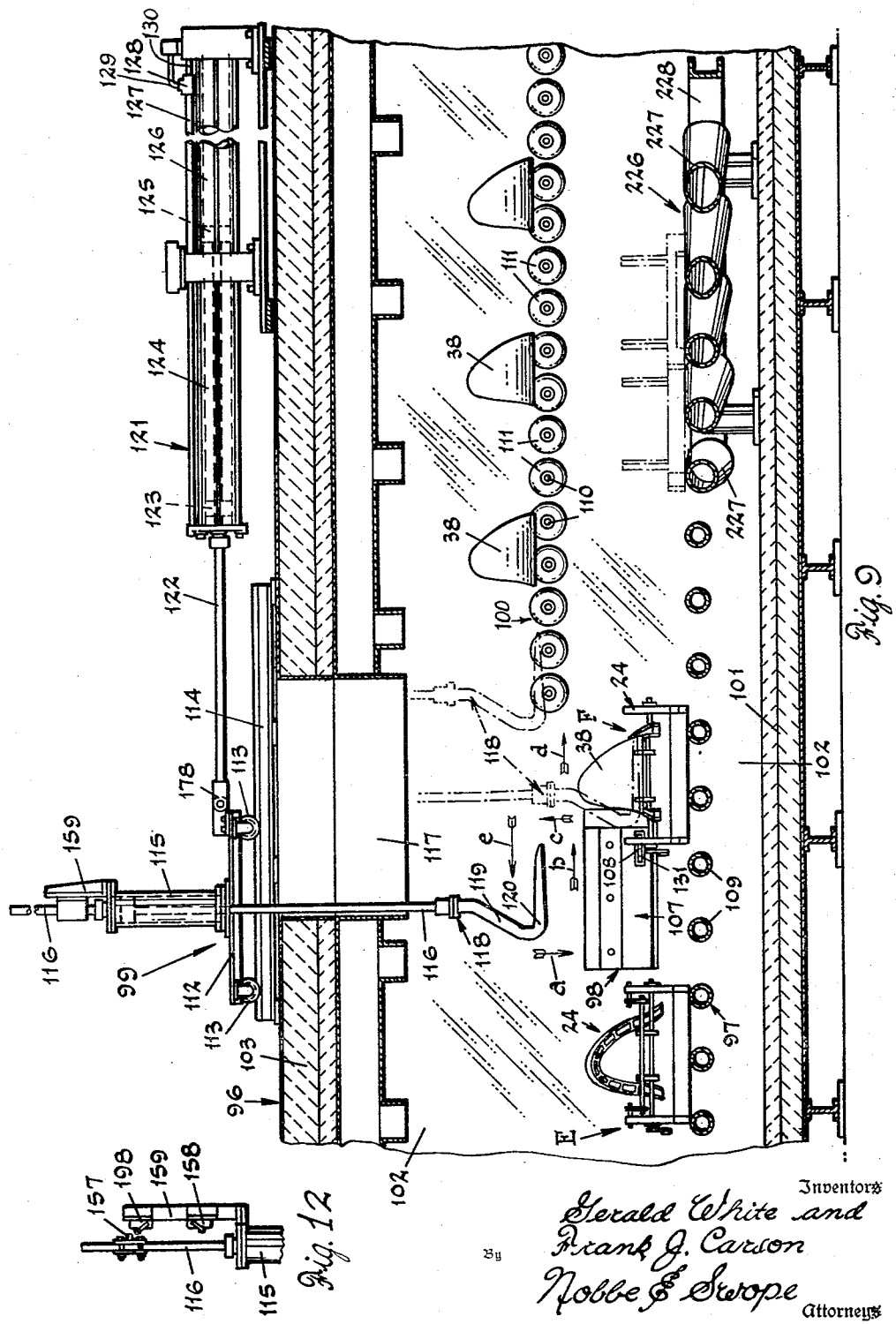
Fig. 12 is a detail view of certain of the control elements employed in the operation of handling apparatus located in the furnace disclosed in Fig. 7.

The valve 152, when activated, supplies pressure from supply pipe 154 to pipe 155 and the top of cylinder 115, the lower end thereof exhausting through the valve by way of pipe 156. The piston rod 116 is now operated to lower the frame 118 to its lowermost position. For convenience of illustration and as shown in Fig. 12, the rod 116 extends outwardly of the cylinder 115 through suitable glands and carries an adjustably located cam 157 (Fig. 12). As determined by the location of this cam, the length of stroke of the piston rod 116 to lower the frame 118 may be established and at the desired point of descent, the rod will be adapted to carry the cam 157 into engagement with a normally open micro-switch 158 carried by a bracket 159 secured to the top of the cylinder casing. The switch 158 is connected to the source line 132 and when closed completes a circuit by line 160, closed contacts 161—162 of relay switch 163, line 164 to coil 165 of relay switch 136 and line 166 to line 153 and source line 141. Coil 165 when energized operates the armature 167 against spring 168 to open contacts 134—135 and close the pair of contacts 169—170. The pair of contacts 134—135, when open, deenergizes the circuit of coil 138 so that the armature 142 by spring 143 is retracted to open pairs of contacts 144—145 and 146—147 which open the holding circuit for the coil and simultaneously the circuit to the valve 152 allowing the same to return to a neutral position. When the contacts 169—170 close, a circuit therethrough will be set up from source line 132, line 171, line 172 to one side of electrically operated four-way valve 173 and thence by lines 174 and 153 to source line 141.

The valve 173 is connected by pipes 175 and 176 to cylinder 124 of the air-motor 121 and when actuated, will direct pressure to the forward end of cylinder 124 by pipe 175 and from supply pipe 177, the exhaust from the rear end of said cylinder being through pipe 176. As the piston rod 122 is moved inwardly of the cylinder by piston 123, its rate of motion will be governed by the piston 125 and rate of exchange of flow between the ends of cylinder 126. Since the valve 128 located in conduit 127 is not open, the rate of flow will be confined to the volume of conduits 127 and 130 so that the truck 112 which is connected by the piston rod 122 by a bracket 178 will traverse the rails 114 at a controlled rate of speed in the direction of arrow b. When the truck arrives at a position substantially vertically aligned with the first representative position of the frame 118, it will automatically cause a temporary cessation of its movement.

Figure 13:
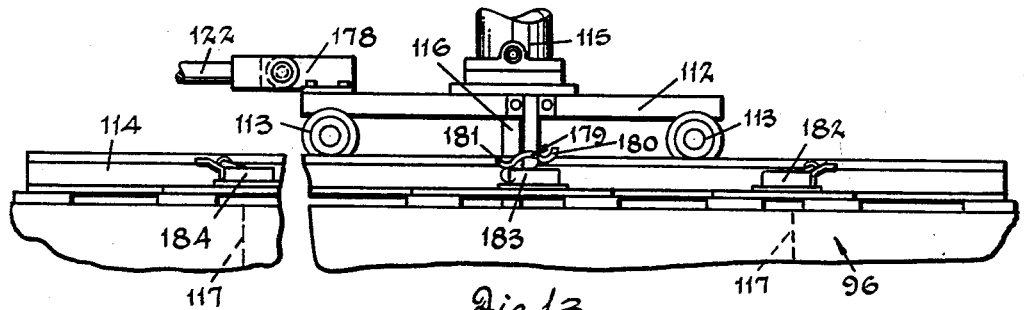
Fig. 13 is a fragmentary side elevation of the furnace and of a portion of the glass sheet handling apparatus.
Figure 14:
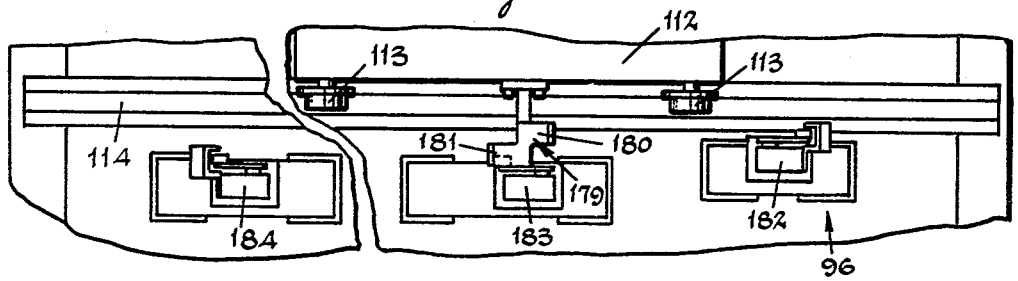
Fig. 14 is a plan view of the furnace construction shown in Fig. 13.

For this purpose, the truck, as will be noted in Fig. 13, carries a tiltable arm 179 which is adapted in sequence to effect the actuation of three micro-switches. As illustrated conventionally in Fig. 14, this arm may be provided with oppositely directed fingers 180 and 181 which are so arranged that the fingers 180 will engage the arm of micro-switch 182 at the limit of the return travel of the truck and in so doing tilt the arm 179 in order that the finger 181 will be positioned to engage, in sequence, the arms of micro-switches 183 and 184 during forward movement of the truck. Preferably when engagement is effected at micro-switch 184, the finger 181 will tilt the arm 179 to position the finger 180 for subsequent operation and to remove the finger 181 from undesirable engagement with the switch 183 in a reverse manner. Thus, as the truck 112 approaches this predetermined station and the legs 120 of the frame 118 have accepted the glass sheets 38 from the mold 24, the finger 181 engages the micro-switch 183.

The switch 183 from source line 132 and by line 185 through closed contacts 186—187 of relay switch 188, line 189, through coil 190 of relay switch 163 and line 191 to source line 141 completes a circuit to actuate the armature 192 against spring 193. When contacts 161—162 are disengaged, the circuit therethrough to coil 165 of relay switch 136 is opened whereupon spring 168 retracts armature 167 to open the circuit of valve 173 at contacts 170—171 allowing said valve to return to neutral. This halts the truck 112 since the pressure is dissipated in cylinder 124. Also when armature 167 is retracted, contacts 134—135 are again engaged; however, since micro-switch 131 and contacts 144—145 of relay switch 139 are open, coil 138 of this switch will not be energized.

When contacts 161—162 are open, armature 192 closes contacts 194—195 to establish a circuit from source line 132 by lines 196—197 to the second side of valve 152 and thence by line 153 to source line 141. The valve then directs pressure from supply pipe 154 to the lower end of cylinder 115 by pipe 156 while the upper end of the cylinder may exhaust through pipe 155. The piston rod 116 now raises frame 118 as indicated by arrow c (Fig. 9) and the legs 120 thereof remove the glass sheets 38 from the contact fingers 39 associated with the mold upon which they were bent.

At a predetermined point in the upward travel of the frame 118, the cam 157 on rod 116 engages and closes the normally open micro-switch 198 mounted on the upper end of bracket 159. This switch completes a circuit from source line 132, line 199, closed contacts 200—201 of relay switch 202, line 203, coil 204 of relay switch 188 and line 205 to source line 141 by lines 166—153. The armature 206 against spring 207 is now actuated to open contacts 186—187 and close contacts 208—209. The disengagement of contacts 186—187 deenergizes coil 190 of relay switch 163 whereby armature 192 thereof is retracted by spring 193 to open contacts 194—195 thereby opening circuit of valve 152 at lines 196—197. The armature 192 allows reclosing of contacts 161—162; however, since microswitch 158 is presently open, the circuit therefrom to coil 165 of relay switch 136 will not be reestablished.

Contacts 208—209 by line 210 complete a circuit from source line 132, line 211 which constitutes a branch to valve 173 through line 172. Valve 173 is now actuated again to resume the direction of pressure to the forward end of cylinder 124 by way of pipe 175. The piston 123 on rod 122 thus is moved to cause the truck 112 to continue its forward travel as indicated by arrow d (Fig. 9). The frame 118 will accordingly carry the glass sheets 38 forwardly to the second position indicated in broken line (Fig. 9) when said sheets will be received on the rollers 111 of shafts 110, or upon conveyor belts operatively driven thereby in the event that belts are employed. When the truck has delivered the glass sheets onto the rollers 111, it simultaneously carries the finger 181 into engagement with normally open micro-switch 184 and causes tilt arm 179 to be swung so that the finger 180 will be operatively positioned.

Micro-switch 184 from source line 132 and by line 212 establishes a circuit for coil 213 of relay switch 202 and thence by line 214 to source line 141. The armature 215 of this relay when actuated against spring 216 produces opening of contacts 200—201 to break the circuit of coil 204 at lines 199—203. Spring 207 now retracts armature 206 of relay 188 thereby opening circuit to valve 173 from lines 172, 211 and 210 at contacts 208—209. Also the circuit of coil 190 is restored at contacts 161—162 but since micro-switch 183 is normally open the circuit of said coil will not be completed.

Actuation of armature 215 also engages pairs of contacts 217—218 and 219—220. Contacts 217—218 from source line 132 and line 221 complete a circuit to the second side of valve 173 and by branch 222 to valve 128, the return being by way of lines 174 and 223 to source 141. Pressure through the valve is now directed to the rear end of cylinder 124 through pipe 176 to produce outward movement of the piston rod 122 and consequent rearward travel of truck 112 along rails 114 to return the carrying frame 118 to its starting point and as indicated by arrow e (Fig. 9).

Closure of contacts 219—220 completes a holding circuit for coil 213 since micro-switch 184 will be immediately opened as the truck 112 carries the finger 181 from engagement therewith. This holding circuit is completed from source line 132 through normally closed micro-switch 182 by line 244, contacts 219—220 and line 225 branching to line 212 and said coil.

Branch line 222 to valve 128 on conduit 127 of cylinder 126 causes said valve to open thereby permitting exhausting flow ahead of piston 125 to escape through conduits 129—130 to increase the flow to the rear end of cylinder 126. By this action, the piston 125 is allowed to move more rapidly and reduce its "braking" effect upon movement of piston 123 in cylinder 124. As a consequence, the truck 112 is enabled to return to its initial position or rearwardly more expeditiously than it moves forwardly during the other portion of its cyclic operation. Thus when the truck is returned to a position as indicated in full line in Fig. 9, the finger 180 engages micro-switch 182 to open the same and deenergize the coil 213 since the circuit thereof is broken through holding circuit lines 224—225. This concludes one cycle of the glass sheet handling apparatus; however, as the molds 24 are carried forwardly on the conveyor 97 in a substantially regularly spaced manner, the resumption of operation by the truck 112 and frame 118 is intended to be quite frequent.

The bending mold 24, from which the glass sheets 38 were removed, continues forwardly along the conveyor 97 until it is received on the semi-circular conveyor section 226 equipped with conical rollers 227. The rollers are disposed and journaled relative to the frame 228 of the conveyor so that their upwardly directed surface areas will be in a common horizontal plane. This will enable the molds carried thereon to move in a free manner from the conveyor 97 within the furnace 96 to the return conveyor section 229 thereof located outside of the furnace. Although shown in broken line in Fig. 7, the conveyor 97 may include a second semi-circular conveyor section 230 that is located between the return conveyor section 229 and that section of conveyor 97 on which the bending molds are loaded at the entry end A and carried forwardly into and through the heating and bending area B.

Preferably the semi-circular conveyor section 226 is contained within a chamber or annex 231 of the furnace proper. Suitable shields or baffles may be arranged in this annex area to control and prevent the undesired entrance of outside cold air into the controlled atmosphere maintained in the annealing area C of the furnace 96.

In Figs. 16 to 19, inclusive, there is shown a modified construction of handling apparatus for bent glass sheets and which is designated in its entirety by the numeral 232. This apparatus is intended to carry out the same novel features of furnace operation and handling as that disclosed in Figs. 7, 8 and 9 and to convey the bent glass sheets through the annealing zone of a bending furnace to provide the same desired uniformity of cooling. The apparatus 232 may be constructed to operate in a conventional bending furnace as indicated at 233 in Fig. 16 and to be located particularly in the annealing area C thereof.

As previously mentioned, these furnaces have an entry or loading end A where the bending molds are opened and the flat glass sheets located thereon; a heating and bending area B wherein the sheets are bent into conformity with the shaping surface of the mold; the annealing area C and an exit or unloading end D where heretofore the sheets have been removed from the bending molds. As in the instance of the bending furnace 96, previously described, the bending furnace 233 is formed to have a floor 234, side walls 235 and a top wall or ceiling 236 and is equipped with a continuous roller conveyor that is provided with semi-circular sections 226 and 230 and a return conveyor section 229. Molds of the character of those shown in Figs. 1 to 4, inclusive, are also typical of the structures on which glass sheets are bent and then annealed in these furnaces. The glass sheets 38 are thus loaded onto molds, such as the bending mold 24, at the furnace entry end A; are carried on conveyor 97 through the heating area B wherein they are subjected to highly heated temperatures ranging upwardly to approximately 1200° F. and then are continuously moved into the annealing area C wherein the residual heat is gradually dissipated under controlled conditions until the glass sheets have reached normal handling temperatures. According to our invention, however, the several advantages already set forth are obtained when the glass sheets are unloaded or removed from the bending molds at a time when a differential of temperature begins to develop between the glass and the metal molds. At this point in their processing, the sheets, while substantially rigid, are still heated sufficiently to render any handling, other than mechanical, prohibitive.

The essential difference between the bending furnace 96 and the furnace 233 resides in the utilization of individual frames or hangers for the glass sheets. In this manner, while carrying out the spirit of the invention, the glass sheets are supported throughout the annealing period by the same member that removed them from the mold on which they were bent. Thus the handling apparatus 232 generally comprises a conveyor 237 within the annealing area of the furnace 233; a return conveyor 238 arranged in parallel along the exterior of the furnace; a transfer mechanism 239 within the furnace and between the inner ends of conveyors 237 and 238; a similar transfer mechanism 240 located at the exit end of the furnace and between the outer ends of said conveyors and an automatically operating control system for carrying out the sequential activities of the conveyors and transfer mechanisms in their entirety.

The conveyor 237, as will be seen particularly in Figs. 17 and 18, is comprised of a pair of sprocket chains 241 which are trained about sprockets 242, the outer sprockets not being shown. The sprockets are fixedly mounted on shafts 243 which are journaled in suitable bearings mounted on the side walls of the furnace 233 and one of said shafts is provided with a sprocket 244 to drive the same and the sprockets 242 mounted thereon. Carried by and regularly spaced throughout the continuity of the chains 241 are a plurality of hanger elements 245 having end portions formed as hooks 246 and interconnected by transversely disposed webs 247. Preferably the hooks 246 are formed to provide a substantially horizontally disposed finger or carrier element 248. The chains 241 are of a conventional construction and are equipped with rollers 249 between the individual links thereof and means, such as the rails 250, is herein provided to sustain the weight of the chains and the hanger elements 245 as they travel throughout the upper or return flights.

Adjacent the inner sprockets 242 a second pair of sprockets 251 on supporting shaft 252 are located to direct the chains from a substantially short section of horizontal direction of travel to an inclined section of travel whereby as the chains are carried from the upper flight U into the lower flight L they will travel horizontally, then angularly upward and then continue through the remainder of the lower flight along a horizontal path of movement. For this purpose, special rail sections 253 are provided to guide the chains to upwardly inclined rail sections 254 located at the inner end of horizontally disposed rails 255. In the case of the rails 250, 253, 254 and 255, brackets 256 are employed to support the same on the side walls 235 of the furnace. The chains 241 accordingly will be carried throughout their upper flight sections along the rails 250 between the sprockets 242 and, at the innermost pair of sprockets, be carried into their lower flights, where they are supported on rail sections 253, about sprockets 251, upwardly on rail sections 254 and then on the rail sections 255. The purpose for supporting the chains 241 in such a manner or at two elevations is to provide clearance between the glass sheets on the hanger elements 245 and the bending molds that are being conveyed therebeneath.

As herein provided, the transfer mechanisms 239 and 240 (the mechanism 239 being shown in detail), include a truck 257 supported by wheels 258 on rails 259; a cylinder 260 carried in suspended relation to the truck 257 and a frame 261 which is adapted to remove the glass sheet conveyor hangers 262 from the return conveyor 238 to the conveyor 237 within the annealing area C of the furnace.

In order to suitably enclose the transfer end of the conveyor 238, the semi-circular conveyor section 226 and the adjoining end of the return section 229 of the roller conveyor 97, the furnace is provided with a chamber or annex 263 having a side wall 264 and top wall or ceiling 265. The ends of the annex 263 may be provided with suitable baffles or shields, indicated at 266 in Fig. 16, in order that the conveyor hangers 262 can pass freely into said chamber and the molds 24 be removed therefrom without creating too great a disturbance to the controlled atmosphere within the furnace. Also in the wall 235 separating the annex chamber from the interior of the furnace proper, apertures 266' are provided for movement of the transfer mechanism 239 and the mold therebetween.

The molds 24 are carried by the driven rollers 109 of conveyor 97 forwardly through the heating area B of the furnace to a point substantially at the left-hand end of Fig. 18. By means of suitably larger and smaller sprockets on the ends of adjacent rollers 109, the succeeding rollers are caused to rotate more rapidly and thus carry a mold entering the area away from the next succeeding mold and until, by means of a further speed change, the mold will travel more slowly. Accordingly as the mold enters the plurality of rollers 109, indicated within the bracket R, it will be advanced ahead of the next succeeding mold until it is carried onto the plurality of rollers indicated by the letter S when it will be carried more slowly. The next plurality of rollers are arranged to carry the molds in a downwardly angular course to lower the general elevation of the molds until they are received on the semi-circular conveyor section 226. Now, as a bending mold is moved onto the more slowly rotating rollers at S; the roller 53 of lever 50 of the associated lifting device 25 is carried into engagement with and across the surface of a cam element 267 mounted on a plate 268. As in the case of the cam element 98, the cam element 267 has a cam surface 269 on the depending flange 270 thereof. The flange 270 is provided near its forward end with a slot 271 in which is received the actuator arm 272 of a micro-switch 273.

Assuming, for a moment, that a transfer of glass sheets has been made, the chains of conveyors 237 and 238 are both stationary and the truck 257 is positioned as shown in Fig. 17, the operation, briefly set forth, continues as the truck traverses the rails 259 into the annexed chamber 263 and the cylinder 260 carried by said truck is actuated to move the frame 261 until a conveyor hanger 262 has been lifted from the adjacent end of the return conveyor 238. Normally the truck is intended to advance part way toward its opposite terminus of travel or when it is substantially midway between the chains 241 of the conveyor 237 before coming to a stop. Then, as the roller 53 engages the arm 272, a new sequence or cycle of operation is automatically initiated.

In order to carry out the combined and interrelated functions of the conveyors 237 and 238 and the transfer mechanisms 239 and 240, an electrical control system, as diagrammatically illustrated in Fig. 19, has been provided as explanatory and typical of such an arrangement. As shown herein, the micro-switch 273, normally open, is connected to one source line 274 and, when momentarily closed, completes a circuit by line 275, closed contacts 276—277 of relay switch 278, line 279, through coil 280 of relay switch 281 and line 282 to the opposite source line 283. The coil 280, when thus energized, actuates the armature 284 against bias of spring 285 to close pairs of contacts 286—287 and 288—289; the contacts 286—287 completing a circuit from source line 274, lines 290—291 to line 275 to set up a holding circuit for coil 280 through contacts 276—277. The contacts 288—289 by lines 290—292 complete a circuit by line 293 to one side of a reversible motor 294, mounted on the truck 257, and thence by line 295 to opposite source line 283. The motor 294 operates a gear transmission 296 which drives one of the shafts 297 for the wheels 258.

Operation of the motor 294 propels the truck 257 to the left, as viewed in Fig. 17, from its "idle" position in the chamber 263, through the aperture 266' in the intermediate wall 235 and to a position, as therein shown, or, more specifically, a position substantially midway between the chains 241 of conveyor 237. At this point, a normally open micro-switch 298 is engaged. This switch is connected to source line 274 and by line 299, closed contacts 300—301 of relay switch 302 and line 303 establishes a circuit for the coil 304 of relay switch 278, completing the same by line 305 to source line 283. Upon energization of coil 304, the armature 306 is actuated against spring 307 to open contacts 276—277 and close pairs of contacts 308—309, 310—311 and 312—313.

Disengagement of contacts 276—277 operates to deenergize coil 280 of relay switch 281 whereupon spring 285 retracts armature 284 to open circuits through lines 290—291 and 292—293 at contacts 286—287 and 288—289. This discontinues the holding circuit through lines 275—279 to the coil and also the circuit of motor 294 through line 293. This stops further motion of the truck 257. Now, by closure of contacts 308—309 by line 314 from source line 274 and line 315, a circuit is completed through normally closed switch 316 and line 317 to an electrically controlled four-way valve 318, thence by line 319 to source line 283.

The valve 318 is connected to cylinder 260, carried by the truck 257, by conduits 320 and 321 and to a supply of air pressure by pipe 322. The valve when operated, directs pressure through conduit 320 to the rear end of the cylinder to move the piston rod 323 thereof outwardly and thereby the frame 261 forwardly. The frame 261 is connected to piston rod 323 in its central portion and adjacent its ends carries rods 324 which are slidably mounted for reciprocal movement in sleeves 325 mounted on the truck 257. The rods cooperate to maintain the frame 261 in a substantially horizontal plane. On the opposite side of the frame 261 are arranged forked members 326 that are adapted to engage and support the glass sheet conveyor hangers 262. The piston rod 323, accordingly, carries the frame 261 forwardly until the switch 316 is tripped thereby opening lines 315—317 to the valve 318 which then returns to neutral.

While this phase of the transfer operation is in progress, a timing relay 327 is actuated through a control circuit originating a source line 274, lines 314—328, contacts 310—311 of relay switch 278 and line 329; the timing relay receiving a supply circuit from source line 274 by line 330 and source line 283 by line 331. The timer 327 sets up a delay interval during which the frame 261 is carried forwardly to a position, as shown in Fig. 17; then a circuit is created whereby the drive for the sprockets 242 is started to move the chains 241 and the hangers 245 carried thereby.

Simultaneously with activation of the timing relay 327, a second timing relay 332 is activated through a circuit by lines 314—333, closed contacts 312—313 and line 334 to the relay, it having individual sources from source line 274 by line 335 and source line 283 by line 336.

The timing relay 332 is adjusted to govern the sequentially occurring movements of the chains 241 whereby during their activity, the hanger elements 245 thereon will be advanced for example from a position indicated at X to a second position as indicated at Y and, while being so moved, operate to remove a conveyor hanger 262 from the forks 326 of the frame 261 and carry said hanger so that the horizontally disposed lower extensions 337 will be located beneath and in supporting relation to the glass sheets presently supported above the shaping surface of a mold 24 by the lifting device 25. This device, of course, was actuated as the mold was moved past the cam 267. Since the mold 24 is also moved slowly forward by the rollers 109 of conveyor 97, the mold will be gradually discharged from the area at which the hanger 262 came into engagement with the glass sheets.

The timing relay 327 thus creates a circuit by line 338 through the coil 339 of relay switch 302 and thence to source line 283 by line 340. The energized coil actuates armature 341 against spring 342 to open contacts 300—301, thereby deenergizing coil 304 of relay switch 278, and closing contacts 343—344 to complete a circuit from source line 274 by line 345, closed contacts 343—344 and line 346 to motor 347 and thence by line 348 to source line 283. The motor 347 drives the shaft 243 through a suitable gear drive operating sprocket 244 and accordingly causes rotation of the sprockets 242 and the chains 241 trained thereabout.

Deenergization of coil 304 permits spring 307 to retract armature 306 to open pairs of contacts 308 to 313, inclusive, thereby disconnecting the circuit to valve 318 and the starting circuits for timing relays 327 and 332. The contacts 276—277 likewise are reengaged; however, since micro-switch 273 is presently open, the particular circuit to coil 280 of relay switch 281 will not be reestablished.

While the hangers 245 are moving to the position indicated at Y, the preceding hangers are carrying their supported glass sheets forwardly through the annealing zone of the furnace, and the hangers in the upper flight of the chains 241 are moving toward their sequence position as indicated at X. Now during the later phase of the movement of the chains 241, the timing relay 332 actively sets up a circuit to initiate the travel of the truck 257 back to the chamber 263 and rearward movement of the frame 261. Also by branch line 360a, a circuit is established to the valve 318 to connect supply pipe 322 to conduit 321 and the forward end of cylinder 260. This operates to retract the frame 261 toward the truck 257. Thus the timer by line 349 energizes coil 350 of relay switch 351, the circuit being completed by line 352 to source line 283. Coil 350 actuates armature 353 against spring 354 to complete circuits through pairs of contacts 355—356 and 357—358. The contacts 355—356 by line 359 from source line 274 and line 360 reestablish the operation of motor 294 and thence by line 295 to source line 283. Line 360 however, is connected to the second side of motor 294 so that through transmission 296 the wheels 258 are caused to propel the trunk 257 toward and into the chamber 263. The contacts 357—358 complete a holding circuit for coil 350 from source line 274, normally closed (on one side) micro-switch 361, line 362 and 363 to line 349 and the coil.

When the relay 327 becomes inactive, the temporary circuit of coil 339 is opened whereupon spring 342 retracts armature 341 to open contacts 343—344 thereby opening service circuit to motor 347 and also closes contacts 300—301 reestablishing the circuit of coil 304 which is then incompleted at micro-switch 298.

At the end of its travel into the chamber 263, or to the right as viewed in Fig. 17, the truck 257 causes the switch 361 to open the holding circuit for coil 350 through lines 362 and 363. This deenergizes the coil and spring 354 retracts armature 353 to open the circuits at contacts 355 to 358 inclusive thereby opening the service circuit by line 260 to motor 294. The chains 241 have accordingly completed one sequential step in their periodic operation to advance the cooling glass sheets forwardly through the annealing area C of the bending furnace 233 while the truck 257 of the transfer mechanism 239 has been returned into chamber 263 to pick up a next succeeding conveyor hanger 262 from the chains 241 of conveyor 238.

However, as the micro-switch 361 opens the circuit between lines 274 and 362, it simultaneously creates a circuit from source line 274 to line 364 upon engagement with contact 365 for a timing relay 366. This relay serves a dual purpose in that it produces an interval of operation when the frame 261 is carried forwardly to cause engagement of the forks 326 with a hanger 262 on conveyor 238 and also creates a circuit to a timing relay 367 to produce both a rearward movement of the frame 261 while the truck is part-way returned toward the annealing area of the furnace. Thus the timing relay 366, receiving its service supply from line 274 by line 368 and source line 283 by line 369 actuates the timing relay 367 by line 370 and the coil 371 of double-action relay switch 372 by branch 373 the circuit of said coil being completed by line 374 to source line 274 and by line 376 to the source 283. The circuit of coil 371 is thus from relay 366, lines 370 and 373 and line 377 to source line 283.

When energized, the coil 371 actuates armature 378 against spring 379 to close contacts 380—381 to create a circuit from source line 274 and line 382 to line 383 which connects to valve 318 at line 315. When relay 366 becomes inactive, coil 371 is deenergized and spring 379 retracts armature 378 to disengage contacts 380—381 and open the circuit through lines 383 and 315 to valve 318. The piston rod 323 is now in its outermost position and the forks 326 on frame 261 will have engaged a conveyor hanger 262 then carried by the hangers 245 of chains 241 of the conveyor 238.

The timing relay 367 now operates the second coil 384 of relay switch 372 by way of line 385 and thence by line 386 to source line 283. Coil 384 actuates armature 378 against spring 387 to close contacts 388—389 and establish a circuit by line 390 from source line 274 to line 391 to line 293 leading to motor 294 and thence to source line 283 by line 295. By branch 392 to the opposite side of valve 318, the cylinder under pressure from supply pipe 332 through conduit 321 moves the piston rod inwardly and the frame 261 toward the truck 257. When the timing relay 367 becomes inactive, the spring 387 moves armature 378 to open the circuit of lines 390—391 at contacts 388—389 which stops the motor 294 and operation of the valve 318. And as the truck moves toward the furnace wall 235, the micro-switch 361 is removed from contact 365 to reestablish the normally closed line between source line 274 and line 362. The cyclic operation of the transfer mechanism 239 to remove conveyor hangers 262 from the conveyor 238 to the conveyor 237 and, interlocked therewith, to cause the said conveyors to progress through their cyclic operations; first, thus produces the removal of glass sheets 38 from their associated bending mold 24, and, second, the advance of a hanger 262 forwardly to be taken from the conveyor 238 by the transfer mechanism 239.

The transfer mechanism 240, while not specifically described, is intended to alternately duplicate the operative action of the mechanism 239 or—when the loaded sheets 38 on hangers 262 reach the end D of the furnace and are to be removed while the handling apparatus 232 in its entirety is idle, the hangers, during the next operative cycle, are transferred from the outer end of conveyor 237 to the adjacent end of the return conveyor 238. Obviously this phase of the operation may be carried out by the furnace operators if desired since these ends of the conveyors 237 and 238 are located in areas of normal room temperatures.

This method of annealing glass sheets, after they are bent, thus provides a procedure of control whereby more even uniformity of cooling and a more rapid annealing of the sheets can be effected in a continuous system of operation. Moreover, the success of such a method is realized by apparatus adapted to handle bent glass sheets at a time or in an area of a bending furnace where manual operations would be humanly impossible due to the high temperature. It is, of course, quite evident that once the sheets have been elevated above the shaping surface of their associated mold, an object has been attained since in their spaced relation the sheets will be freed from the differential of residual heat in the molds and can cool uniformly while supported on the molds throughout the annealing zone of the furnace. However, in carrying out the spirit of our invention, we afford further means for automatically removing the glass sheets from the molds and thereby gain a further advantage in that the molds can be more rapidly returned to the loading or entry end of the furnace while the glass sheets are more quickly annealed or may be maintained for longer periods if desired, in cooling atmospheres.

Thus in fully following a bending program as described in connection with Figs. 1 to 4 and 7 to 15 inclusive, a bending mold either of the character of that shown in Fig. 1 or Fig. 3 may preferably be employed. For example, bending molds 24 are continuously advanced to the loading or entry end A of a furnace 96 (Fig. 7) and the sections thereof are moved to their open positions. Also the component parts of the lifting device 25 are returned to their inoperative position by swinging the lever 50 to its angularly outward location. As the molds 24 approach the entry end of the furnace they are thus loaded with flat sheets of glass and then enter the heating and bending area B. When the sheets have been bent into conformity with the shaping surface of the mold, its continuous forward motion carries it and the glass into the annealing area C. Here, the mold 24 approaches the cam element 98 and as the roller 53 of the lifting device 25 rides onto the cam surface thereof, the lever 50 actuates said device. That is to say—as the lever is urged to swing inwardly, the link 55 is moved to rotate the swing-arm 45 and operate the arms 43 through the links 44. The arms 43 in unison rotate their respective rods 41 and the contacting fingers 39 thereon. The ends of the fingers thus engage the lower glass sheet at equally spaced points and raise the sheets to an elevated position above the shaping surface 37 of the mold 24.

Then, as the roller 53 approaches the rear end of the cam surface 107 it actuates the micro-switch 131. Now, through the control system hereinbefore described, the cylinder 115 operates to lower the frame 118 until the horizontal legs 120 are positioned behind the slowly advancing mold. The truck 112 then is operated (switch 158) to carry legs 120 forwardly to overtake the mold and enter between the glass sheets 38 and its shaping surface. Since the mold continues forward until it arrives on the semi-circular conveyor section 226, the conveyor 100 for the glass sheets is elevated sufficiently to provide adequate clearance. When the glass sheets are so supported on the legs 120, the cylinder 115 is caused (switch 183) to raise the frame 118 until the plane in which the sheets are then supported is generally horizontally aligned with the surfaces of the rollers 111. The truck is again caused (switch 198) to carry the frame forwardly until the glass sheets are more or less deposited on the rollers 111 and are carried forwardly from the legs 120. As the frame arrives at this position, the truck actuates a suitable control (switch 184) to produce its rearward motion along the rails 114 until it is stopped by a second control (switch 182). The removing mechanism now remains idle until activated by the next succeeding mold and this depends entirely upon the spacing between the molds.

With reference to the bending furnace disclosed in Figs. 16 to 19, inclusive, there is provided means for supporting the bent sheets on individual conveyors and, in a stepwise series of movements, advance said sheets through the annealing zone of a furnace. This modified arrangement is practiced by means of a pair of chain conveyors, located in parallel relation with one (237) inside the furnace and the other (238) generally outside of the furnace. Each of the conveyors is equipped with hangers for carrying the glass sheet conveyor elements and at one or both ends of the chain conveyors, transfer mechanisms (239—240) are arranged to remove the said conveyor elements from the exterior chain conveyor and move them to a position in which they can be received by the interior chain conveyor or vice versa. The handling and/or lifting mechanism 232, comprised of these co-operating parts, is activated entirely by the sequential advancement of the series of bending molds through the furnace bending area and into the annealing area.

Thus, by employment of the control system illustrated in Fig. 19, a bending mold will advance to an area in which the lifting device will be automatically operated to raise the glass sheets and simultaneously activate such a control system. The roller 53 of the lifting device accordingly depresses the arm of the first control (switch 273) which causes the transfer mechanism 239 to move laterally from the chamber 263 into the furnace proper. When arriving at a predetermined point, the cylinder 260 moves the frame 261 forwardly to place the conveyor hanger 262 in position to be picked up by the hanger 245 on the chains 241 of conveyor 237 which in starting to move through their cycle of operation, engages the conveyor hanger and carry the same forwardly to a supporting position beneath the glass sheets then elevated above the shaping surface of the associated mold. While the conveyor 237 is operating to remove the glass sheets, the conveyor 238 is likewise operating to advance the conveyor hangers carried thereby to a point of removal in the chamber 263. The mold is continuously moving on the conveyor 97. When the hanger 262 has been removed from the frame 261, the cylinder 260 is caused to move said frame rearwardly toward the truck 257 which then begins to move laterally toward and into the chamber 263. Here the cylinder 260 is again operated back and forth to remove a hanger from the conveyor 238. The cycle of operation is concluded as the truck is partially moved again toward the furnace proper.

The removing mechanisms, either designated 99 or 232, are equally applicable for use in connection with a furnace wherein bent and tempered glass sheets are produced. Although not herein shown by way of example, such conventional bending furnaces are disclosed in Patent No. 2,646,647, issued July 28, 1953 to W. P. Bamford et al. According to the disclosure therein made, the molds, such as the bending mold of Figs. 5 and 6, are loaded at an entry end, pass through the heating zone of the furnace and immediately upon their removal are carried forward so as to subject the bent sheet to the blasts of cool air and temper the same. It is entirely within the disclosure of the invention, to then locate a cam element beyond the tempering equipment and remove the sheet so that the mold can be more rapidly returned for re-loading. As herein contemplated, the tempered sheet, although reduced in temperature from the highest critical temperature, is still in a highly heated condition of substantially 600° F., and its removal manually entirely too hazardous for furnace operators. Such hangers as those shown in connection with the mechanism 232 and identified by the numeral 262 may be advantageously employed with a suitable conveyor system to carry the tempered glass sheets from the molds on which they were bent to an inspection and unloading area. Obviously in this manner of use, the mechanisms in their entirety would be located externally of the bending furnace. However, as the mold, as indicated at 67 in Fig. 5, is moved beyond a tempering apparatus, the roller 95 is engaged by a suitable cam to swing the lever 89 inwardly. The lever, through the link 90 and crank 88, rotates the axle 86 to swing the arm 85 and consequently actuate the links 79. The links will thus swing the arms 81 in unison to rotate the rods 82 and thereby the fingers 84 until they have elevated the glass sheet above the shaping surface of the mold 67.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claim.

We claim:

In apparatus for bending glass sheets the combination of a tunnel-type bending furnace having a heating zone and a cooling zone, a bending mold having a shaping surface and mounted for movement through said furnace, a plurality of fingers mounted for movement relative to said shaping surface from a position below said surface to a position above said surface and through the plane of a glass sheet bent into contact with said surface at spaced points within the area of said sheet, means for moving said fingers simultaneously to cause them to lift a bent glass sheet from the shaping surface of the mold to a supported position above said surface, first actuating means located within the cooling zone of said furnace and in the path of travel of said mold for actuating the first mentioned means as the mold moves past said actuating means, a first conveyor in the cooling zone of said furnace arranged above the path of movement of said mold, a glass sheet supporting element, means for carrying the said element on the said conveyor, a second conveyor for delivering the said supporting element to an area adjoining the cooling zone of said furnace, transfer means for transferring said supporting element from the second mentioned conveyor to the first-mentioned conveyor, second actuating means for initiating operation of the transfer means after the mold has moved past the said first actuating means, positioning means on said transfer means for positioning the supporting element to be received by said first conveyor for operating said positioning means after movement of the transfer means from the second to the first conveyor, and means for operating the said first conveyor after said supporting element has been positioned to engage the same and carry it forwardly to remove a bent glass sheet from its supported position above the shaping surface of a mold.

References Cited in the file of this patent

UNITED STATES PATENTS

| | | |
|---|---|---|
| 1,107,072 | Houze | Aug. 11, 1914 |
| 1,332,724 | Hill | Mar. 2, 1920 |
| 1,753,779 | Ferngren | Apr. 8, 1930 |
| 1,889,881 | Thompson | Dec. 6, 1932 |
| 2,137,115 | Marshall | Nov. 15, 1938 |
| 2,261,033 | Marshall | Oct. 28, 1941 |
| 2,348,905 | Hopfield | May 16, 1944 |
| 2,369,368 | Paddock et al. | Feb. 13, 1945 |
| 2,680,936 | Grotefeld | June 15, 1954 |
| 2,761,248 | Crowley et al. | Sept. 4, 1956 |
| 2,761,249 | Olson et al. | Sept. 4, 1956 |

FOREIGN PATENTS

| | | |
|---|---|---|
| 641,777 | Great Britain | Aug. 16, 1950 |